Sept. 29, 1970  G. HEIDRICH  3,530,733

MULTIWAY TRANSMISSION

Filed Oct. 9, 1968  2 Sheets-Sheet 1

Sept. 29, 1970          G. HEIDRICH          3,530,733
MULTIWAY TRANSMISSION
Filed Oct. 9, 1968          2 Sheets-Sheet 2
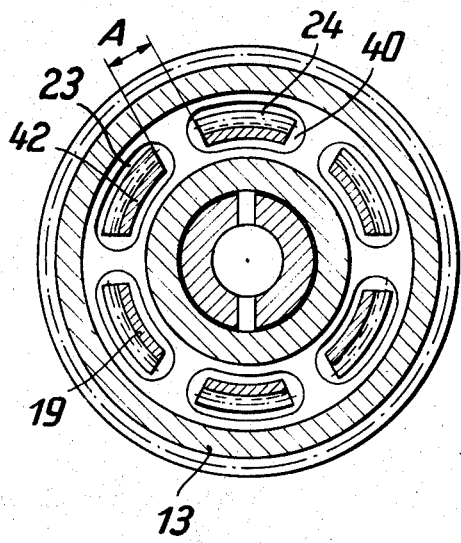
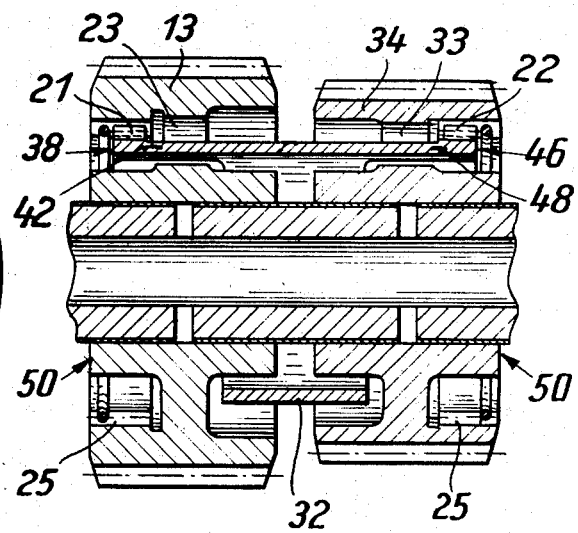
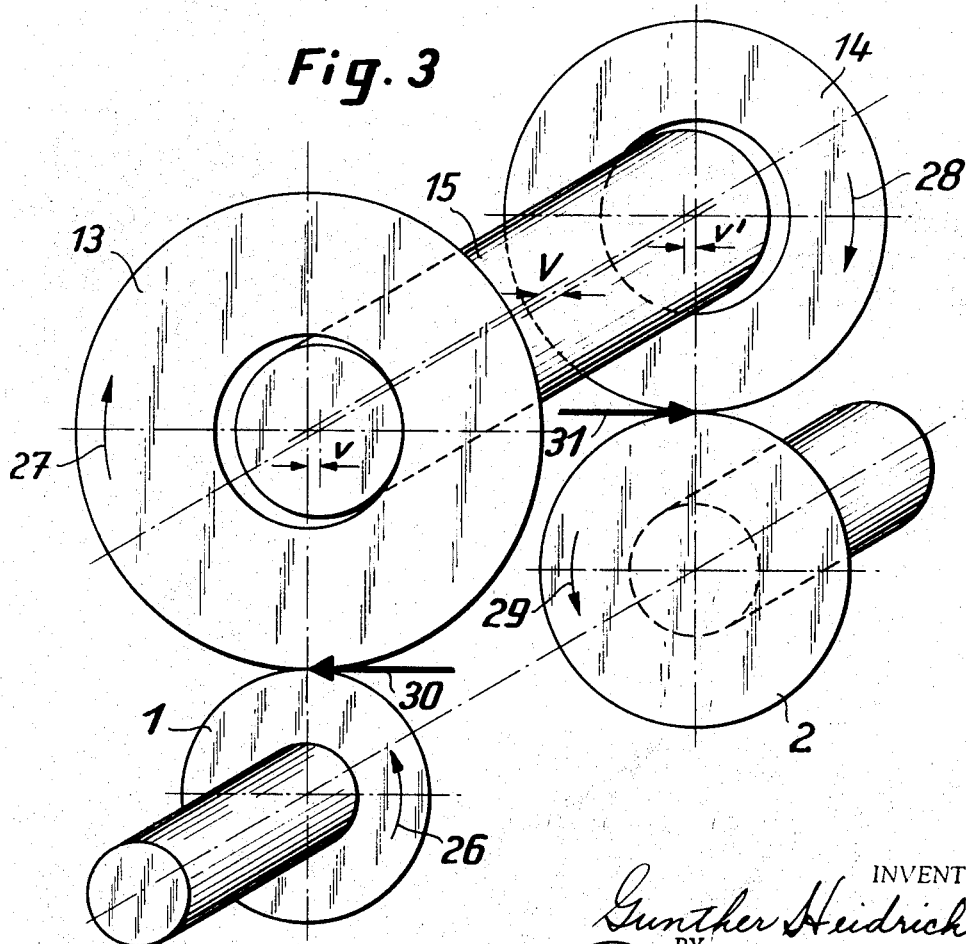
INVENTOR.
Gunther Heidrich
BY
Beaman & Beaman
attys United States Patent Office
3,530,733
Patented Sept. 29, 1970

3,530,733
MULTIWAY TRANSMISSION
Gunther Heidrich, Munich, Germany, assignor to Alexander Stoeckicht, Munich, Germany
Filed Oct. 9, 1968, Ser. No. 766,213
Claims priority, application Germany, Oct. 21, 1967, 1,650,857
Int. Cl. F16h 57/00
U.S. Cl. 74—410
8 Claims

ABSTRACT OF THE DISCLOSURE

A multiway gearing consists of a central input gear driven by an input shaft, a central output gear driving an output shaft and at least three pairs of auxiliary gears. The two gears of each pair are in mesh with the input gear and the output gear, respectively, and are interconnected by a gear coupling sleeve slotted at the ends thereof. The slotted coupling sleeve provides a connection capable of being twisted within certain limits. The special engagement of sleeve and auxiliary gears allows minimum length of the gearing without impairing the flexibility. The construction permits balance of small gear-teeth irregularities, damping of torsional vibrations and reduction of sudden torque peaks in operation.

BACKGROUND OF THE INVENTION

1. Field of invention

In modern engineering there is a tendency for constantly increasing capacities with the smallest possible overall dimensions which makes it imperative for the gearing designer to develop new types of gearings with a high capacity in a small size.

The application of the principle of force division in this connection proves to be especially advantageous. An example is in planetary gearing, the increasing use of which is chiefly due to the fact that this type of gearing is capable of transmitting a great force in a relatively small coaxial dimension with relatively low peripheral speeds resulting therefrom. But there are limits to the use of planetary gearings with a rotating planet pinion carrier, mainly due to the centrifugal forces of the planet pinions acting on the planet pinion bearings. If, therefore, the application of a planetary gearing is not possible, the use of multiway gearings will be especially suitable for very high powers and speeds.

The construction of multiway gearings is based on the feature that the torque of the central input shaft is distributed from the input gear to three or more gears of a first set of gears which are meshing with said input gear. These partial torques are passed from said gears of the first set on to corresponding gears of a second set, one gear of both sets being supported on the same shaft. The partial torques are transferred from the gears of the second set to the central output gear. Thus, due to the fact that the power is distributed on three or more meshing teeth, the teeth will be exploited to a better degree which results in considerably smaller structural dimensions and weights as compared with normal stationary gearings. The coaxial construction also permits a compactness which cannot be obtained with normal stationary gearings.

What is of decisive importance for the operating reliability and the running feature of such multiway gearings is the necessity of providing for suitable constructional measures to ensure a uniform distribution of the load on all the teeth in mesh with each other. A special problem in this arrangement is the connection of the pairs of gears rotatably arranged on a common shaft or axis. The constructional measures provided must be simple so as not to distract from the advantage of the compactness of such gearings.

2. Description of the prior art

Multiway gearings for high capacities and high speeds have already been developed and also constructed in various manners. It is known from the German Pat. 814,981 and the German publication letter 1,149,958, in the interest of a uniform distribution of the load, to hold the input and output pinions unsupported in mesh only with the three or more auxiliary gears, and to connect them with the input or output shafts by flexible double-toothed couplings, which allow no relative rotation between the pinions and their shafts.

The teeth of multiway gearings of this construction are mostly designed as symmetric herringbone teeth. Although with herringbone gearings no additional structural measures need be taken for the balance of the axial components of tooth forces, they yet have important shortcomings which have an unfavorable effect with respect to size and running features. For it is known that with embodiments having symmetric herringbone gears there will occur reciprocating axial impact movements at the two tooth halves so that half of the overall tooth width must be designed for roughly 100% of the total load.

In the case of the multiway gearing known from the German publication letter 1,149,958, the auxiliary gears supported on a common shaft are rigidly connected with each other by means of a simple tooth coupling to prevent relative rotation. It is attempted thereby to obtain a complete balance of inevitable manufacturing and tooth defects and thus a uniform force distribution among the available teeth in mesh with each other in that the simple gear coupling is designed to be adjustable by rotation. This type of construction, however, requies a larger overall assembly. So it is necessary at first to provisionally mount the two gear sets, to statically rig the power input and output; and, after having adjusted the gear couplings, again to disassemble the gear sets in order to fix the coupling rings securely at the auxiliary gears. But even in spite of these circumstantial measures, a complete balance of the irregularities cannot be obtained with the construction because the tooth defects to be balanced are mostly irregularly distributed along the periphery of the gear and, additionally, always are of different sizes. A complete balance of these defects therefore, can be obtained only if one succeeds in providing a possibility of balancing which is capable of adapting itself automatically to the tooth irregularities of different sizes which are present in the meshing part of the teeth with the changing gear positions.

In addition, the insufficient flexibility of a simple gear coupling between two auxiliary gears does not permit the auxiliary gears to properly adjust themselves to their tooth engagements without affecting each other, so that, for example, each gear, per se, may adapt its position to the actual direction of the flanks of the teeth.

Besides, due to the tangential tooth forces acting on the two connected auxiliary gears in opposite directions, there will likewise occur an oppositely directed displacement of the two gears in the range of what the available bearing clearances will permit. This displacement, in the case of only one simple gear coupling being arranged as a connecting element, will compulsorily cause an oblique positioning of the gears whereby the tooth engagement relationships will be impaired.

It is also known to bring about a connection of the two auxiliary gears by means of rotatable elastic elements such as a torsion shaft or other elastic couplings in order to secure the best possible load pressure balance. These embodiments necessarily cause, however, substantial constructional expenses; they are therefore expensive and in addition require large overall dimensions. These large overall dimensions, however, may disturb the free selection of the tooth number and thus prevent a designor from meeting the necessary gear ratios.

It is the object of the invention to provide a multiway gearing of high capacity and high speeds which will automatically balance teeth and manufacturing defects which hardly can be avoided in the fabrication process.

SUMMARY OF THE INVENTION

According to the invention the multiway gearing is characterized in that the force transmitting connection between the two auxiliary gears of each pair is effected by means of a double gear coupling, with the coupling sleeve axially slotted at least at one sleeve end and having its remaining end wall portions extend through holes of at least one auxiliary gear and at the rear of said holes has its teeth, which are provided on the sleeve wall segments between the slots, in engagement with the counter teeth of the auxiliary gear. Owing to the construction of the multiway gearing, in accordance with the invention, there is provided on the one hand between the auxiliary gears a connection which is rotatably elastic within predetermined limits, while on the other hand a construction of minimum length in the longitudinal direction of the gearing has been obtained by the special design and the special cooperation of the coupling sleeve with the auxiliary gears without the length of the double gear couplings being shorter than necessary for good flexibility.

The rotary elasticity of the auxiliary gear connection, apart from balancing the smallest manufacturing defects, also has a damping effect on torsional vibrations as well as a reduction effect on torque peaks in case of jerky operation which will have a favourable influence on the durability of the teeth.

In accordance with a suitable embodiment of the invention, the coupling sleeve is axially slotted at both sleeve ends and has the end wall portions thereof extending through holes in both auxiliary gears in order to engage its coupling teeth with the coupling teeth of the auxiliary gears adjacent their averted end faces. The rotary elasticity is still enhanced by the slots extending from both ends thereby also promoting the adaptability of the coupling in case of existing manufacturing irregularities.

According to another suitable embodiment of the invention the gears have helical teeth. As compared with gears having symmetric herringbone teeth, this design allows substantially smaller tooth widths and an increased running quietness because axial impact loads are not present with single helical teeth. The adaptation to the actual direction of the tooth flanks, in addition, is easier to obtain with single helical teeth because only one adaptation of flank direction is necessary for each gear as compared with two adaptations of flank direction with herringbone teeth. Finally single-helical teeth can be made easier.

The balance of the axial components of the tooth forces is effected by the tooth forces themselves, namely, as known per se, at the respective contact points of the auxiliary gears with the detachable pressure rings fitted at the two center gears, the contact area of which with the auxiliary gears is formed slightly conically.

In accordance with another suitable embodiment of the invention, the nonsupported center gears are held only by meshing with the auxiliary gears and are positively connected with the input and output shafts, respectively, by double gear couplings. These gear couplings also provide for the axial fixation of the two sets of gears, with axial balancing movements of the gear sets and the auxiliary gears being possible by the axially displaceable gear couplings which are disposed between the auxiliary gears supported on common shafts.

Due to the advantageous cooperation of all the parts participating in the transmission of torque, a nearly complete elimination of the manufacturing and tooth defects, and consequently an especially good load pressure balance, is obtained, with the manufacturing expense and size of construction necessary therefore being extremely small.

The special advantages of the gearings in accordance with the invention consist in that, on the one hand, the two unsupported central gears which are flexibly connected with the input and output shaft, respectively, are free to be centered under load in the three or more existing tooth meshing engagements and that, on the other hand, the flexibly and rotatably elastically interconnected auxiliary gears can adjust themselves to optimum tooth meshing engagement without being obstructed by each other.

In addition, a maximum operating reliability and good running characteristics are obtained.

BRIEF DESCRIPTION OF THE DRAWING

The invention will now be described in the following by way of two examples of embodiment shown in the drawing.

In the drawing,

FIG. 2 shows a cross sectional view taken along line II—II of FIG. 1, FIG. 3 shows a schematic representation of the displacement of the axis of the two auxiliary gears supported on a common bearing shaft due to oppositely directed tooth forces, and FIG. 4 shows the connection of a pair of auxiliary gears with another embodiment of the invention.

DESCRIPTION OF THE PREFERRED EMBODIMENTS

Figure 1:
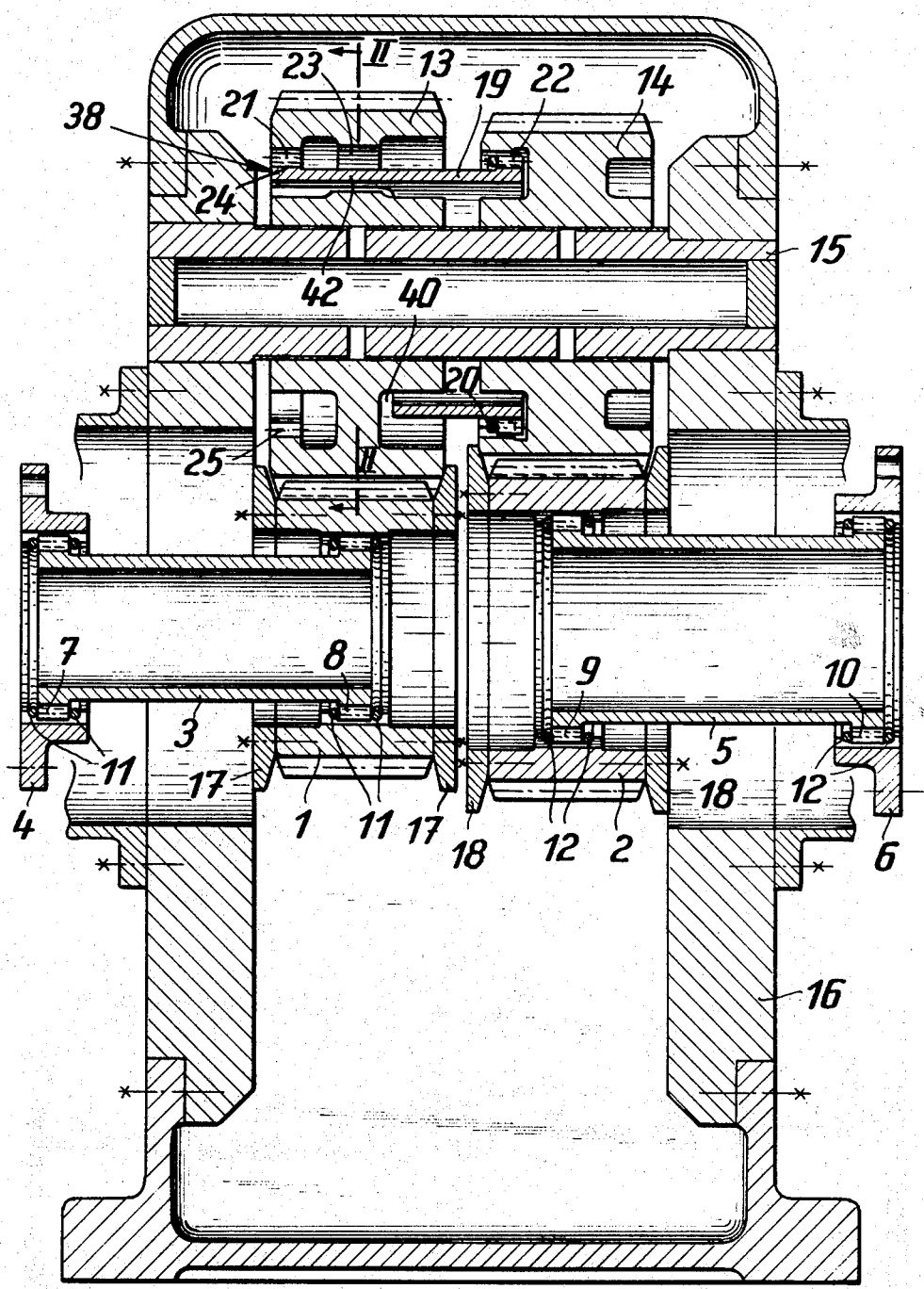
FIG. 1 shows a longitudinal sectional view of a multiway gearing in accordance with the invention.

The multiway gearin gin accordance with FIG. 1 consists of the two central gears 1 and 2, which are respectively connected with the input shaft 4 and the output shaft 6 via the coupling sleeves 3 and 5, respectively, provided with teeth 7, 8, and 9, 10 at their ends, respectively. The fixation of the axial position of the two central gears 1 and 2 takes place via the abutment rings 11 and 12, respectively, by the input shaft 4 and the output shaft 6, respectively. The central gears 1 and 2 provided with helical toothing are each in mesh with three or more pairs of auxiliary gears 13 and 14 uniformly distributed around the periphery of the central gears, one of said pairs being shown in FIG. 1. The auxiliary gears of a pair are rotatably supported on a common bearing shaft 15; FIG. 3 shows how the oppositely directed displacement of the auxiliary gear axes with respect to the axis of their bearing shaft 15 is caused. The arrows 26, 27, 28 and 29 indicate the directions of rotation of the gears, the arrows 30 and 31 indicate the tangential tooth forces generated by the torque and acting on the auxiliary gears 13 and 14. The dimensions $v$ and $v'$ represent the displacement of the axes of the auxiliary gears 13 and 14 with respect to the theoretical mean axis; the dimensions $v$ and $v'$ are approximately equal to the half of the respective bearing play. As the displacement $v$ and $v'$ is directed in opposite directions, an overall displacement $V = v + v'$ is to be balanced by the coupling sleeve 19 and the tooth couplings 21 and 22, respectively, in order to avoid obliquity of the auxiliary gears 13 and 14.

The tooth flanks of the toothings 21 and 22 are advantageously longitudinally crowned in order to obtain an improved flexibility and to prevent an edge supporting effect.

FIG. 4 shows another embodiment of the invention in which the coupling sleeve 19 shown in FIG. 1 extends also through the right-hand gear. The elongated coupling sleeve 32 is provided at both ends 38, 46 with slots extending axially towards the coupling sleeve center as can be seen in the lower half of FIG. 4. With this, the sleeve 32 may be pushed through the recesses 23 and 33 of the auxiliary gears 13 and 34, respectively, with its remaining end segments 42, 48 and has its teeth in engagement with the counter teeth 25 arranged adjacent to the auxiliary gear end faces 50 facing away from each other. The flexibility and rotary elasticity of the coupling is thereby still more improved.

The width A of the slots of he coupling sleeve 19 and 32, respectively, and the length thereof may be selected arbitrarily; the dimensions of the slots, however, govern the desired degree of the rotary elasticity of the coupling.

Of course, the construction of the flexible and rotary elastic connection of the two auxiliary gears 13 and 14 in accordance with the invention allows also for the said auxiliary gears to have other types of teeth instead of single helical teeth. The invention has also an especially advantageous effect in connection with asymmetric herringbone teeth because the latter, with regard to axial impact loads, are similar to single helical teeth.

What I claim is:

1. A multiway gearing comprising a casing, an input shaft drivingly connected with a central input gear, an output shaft drivingly connected with a central output gear, at least three bearing shafts supported in said casing and uniformly distributed around said central gears with their axes parallel to said central gear axes, at least three pairs of auxiliary gears, each pair comprising first and second gears rotatably coaxially mounted on one of said shafts, the first and the second auxiliary gear of each pair each having first sets of teeth adapted for meshing with said central input gear and said central output gear, respectively, and each gear including a web portion, a second set of teeth coaxially provided on each of said first and second auxiliary gears, axially extending holes defined in said web portion of said first auxiliary gear, said second set of teeth of said first auxiliary gear being defined on the side of said web portion remote from the associated second auxiliary gear, and at least three gear coupling sleeves having ends, each of which is arranged between the first and the second auxiliary gear of one of said pairs, each sleeve having teeth at both ends thereof and being paraxially slotted at least at one end, the sleeve segments between the slots extending through said holes in said first auxiliary gear and the end teeth on said sleeve segments being in engagement with said second teeth of said first and second auxiliary gears.

2. A multiway gearing in accordance with claim 1, wherein said central gears and said auxiliary gears are provided with single helical gear teeth.

3. A multiway gearing in accordance with claim 1, wherein said auxiliary gears are provided with asymmetric herringbone teeth.

4. A multiway gearing in accordance with claim 1, wherein said central gears are held only by the meshing engagement with said first and second auxiliary gears, respectively, and are positively connected with said input and output shaft, respectively, by gear couplings.

5. A multiway gearing comprising a casing, an input shaft drivingly connected with a central input gear, an output shaft drivingly connected with a central output gear, at least three bearing shafts supported in said casing and uniformly distributed around said central gears with their axes parallel to said central gear axes, at least three pairs of auxiliary gears, each pair comprising first and second gears rotatably coaxially mounted on one of said shafts, the first and the second auxiliary gear of each pair each having first sets of teeth adapted for meshing with said central input gear and said central output gear, respectively, and each gear including a web portion, a second set of teeth coaxially provided on each of said first auxiliary gears on the side of said web portion remote from the associated second auxiliary gear and a second set of teeth coaxially provided on each of said second auxiliary gears on the side of said web portion remote from the associated first auxiliary gear, axially extending holes defined in said web portion of said first and second auxiliary gears and at least three gear coupling sleeves having ends, each of which is arranged between the first and the second auxiliary gear of one of said gear pairs, each sleeve having teeth and paraxially slotted at both ends thereof, the sleeve segments between the slots extending through said holes in said auxiliary gears and the end teeth on said sleeve segments being in engagement with said second teeth of said first and second auxiliary gears.

6. A multiway gearing in accordance with claim 5, wherein said central gears and said auxiliary gears are provided with single helical gear teeth.

7. A multiway gearing in accordance with claim 5, wherein said auxiliary gears are provided with asymmetric herringbone teeth.

8. A multiway gearing in accordance with claim 5, wherein said central gears are held only by the meshing engagement with said first and second auxiliary gears, respectively and are positively connected with said input and output shafts, respectively, by gear couplings.

References Cited

UNITED STATES PATENTS

| | | | |
|---|---|---|---|
| 1,209,108 | 12/1916 | Oskar et al. | 74—410 X |
| 3,397,591 | 8/1968 | Delescluse | 74—410 |

FOREIGN PATENTS

| | | |
|---|---|---|
| 948,803 | 2/1949 | France. |
| 879,582 | 10/1961 | Great Britain. |

LEONARD H. GERIN, Primary Examiner

U.S. Cl. X.R.

74—411